United States Patent

Kurokawa et al.

[11] Patent Number: 4,833,031
[45] Date of Patent: May 23, 1989

[54] MAGNETIC RECORDING MEDIUM

[75] Inventors: Hideo Kurokawa, Katano; Tsutomu Mitani, Neyagawa; Masaru Odagiri, Kawanishi; Taketoshi Yonezawa, Ibaraki, all of Japan

[73] Assignee: Matsushita Electric Industrial Co., Ltd., Osaka, Japan

[21] Appl. No.: 27,895

[22] Filed: Mar. 19, 1987

[30] Foreign Application Priority Data

Mar. 20, 1986 [JP] Japan ................................ 61-62214
Oct. 14, 1986 [JP] Japan ............................... 61-243437
Oct. 14, 1986 [JP] Japan ............................... 61-243438

[51] Int. Cl.$^4$ .............................................. G11B 5/64
[52] U.S. Cl. ..................... 428/336; 427/131; 428/408; 428/694; 428/695; 428/900
[58] Field of Search ............... 428/694, 695, 900, 328, 428/408, 336; 427/131

[56] References Cited

U.S. PATENT DOCUMENTS 4,540,600  9/1985  Kobayashi et al. ............... 427/131
4,565,734  1/1986  Arai et al. ....................... 427/131
4,645,977  2/1987  Kurokawa et al. ........... 315/111.21
4,647,494  3/1987  Meyerson et al. ................. 428/408
4,647,507  3/1987  Suzuki et al. ..................... 427/131
4,652,483  3/1987  Arai et al. ........................ 427/131

FOREIGN PATENT DOCUMENTS 143206  12/1978  Japan .
60-258727  12/1985  Japan .

OTHER PUBLICATIONS

Patent Abstract of Japan JP-A-58 057 632 (Nippon Denki K.K.) 05-04-1983.
Patent Abstract of Japan, JP-A-59 213 030 (Denki Kagaku Kogyo K.K.) 01-12-1984.
Patent Abstract of Japan, JP-A-61 054 036 (NEC Corp.) 18-03-1986 (Cat. A).
European Search Report, Sep. 21, 1988.

Primary Examiner—Paul J. Thibodeau
Attorney, Agent, or Firm—Cushman, Darby & Cushman

[57] ABSTRACT

A magnetic recording medium is provided with a protective film made of a diamond like carbon film and an organic compound film on a ferromagnetic metal recording film; and it realizes excellent durability and small spacing loss or the like; and as a result high density magnetic recording is obtainable.

15 Claims, 5 Drawing Sheets

Before formation of diamond like carbon film

After formation of diamond like carbon film 790   780

FIG.7(a)

Before formation of diamond like carbon film

FIG.7(b)

After formation of diamond like carbon film

MAGNETIC RECORDING MEDIUM

FIELD OF THE INVENTION AND RELATED ART STATEMENT

1. Field of the Invention

The present invention relates generally to recording medium, and particularly pertains to magnetic recording medium which has thin film of ferromagnetic metal as recording film by which signals such as of video, audio and data are recorded in high density.

2. Description of the Related Art

Recently, a recording medium using ferromagnetic metal such as Co, Ni, Cr and Fe is drawing attention as a recording medium for realizing high density magnetic recording, and various investigations have been made to put it to practical use.

In the magnetic recording, when a spacing is brought about between a recording film and a magnetic head as an electromagnetic convertor, spacing loss is caused thereby. Particularly, in a range of high recording frequency, such as a high density recording, the spacing loss is remarkable. Therefore, the above-mentioned spacing should be made as small as possible. In recording or reproducing of signals of video and audio, the magnetic head is usually made to contact with the recording medium. Even in recording of data signal, when demand for reliability for recording is not severe, for instance, in case of a floppy disk, the recording medium can be made to contact with the magnetic head. When the demand for reliability for recording is high, the magnetic head is made to float apart from the surface of the recording medium to keep non-contact in order to avoid undesirable friction between the magnetic head and the recording medium. However, even in such high reliability multiple magnetic recording system wherein the head runs floating on the recording medium, they are often constructed in a manner that the magnetic head contacts with the recording medium at starting or stopping of the recording or reproducing. And further, since the flotation of magnetic head above the head face causes the spacing loss, they are unsuitable for a high density recording. From the above viewpoint, considering the adaptation for high density recording, it is more desirable that the recording medium contacts with the magnetic head, thereby to realize and retain the reliability for recording and reproducing.

That is, the magnetic recording system has a problem that is fundamentally different from an optical recording system, because in the magnetic recording system, the magnetic head generally contacts with the recording medium.

The aforementioned magnetic recording medium provided with thin film made of ferromagnetic metal such as Co, Ni and Fe and son on as recording film has a large coercive force. Therefore, it is suitable for high density recording, for instance, vertical recording, and so on. However, when a protective film is not formed on a surface of the recording film, the recording film suffers damages such as exfoliation. And therefore, formation of effective protective film on the recording film is advantageous to protect the recording film from the damages by contacting with the magnetic head.

In conventional magnetic recording medium wherein magnetic powder mixed with binder is applied on the base film as substrate, in order to avoid problems caused by contact of the magnetic head and the magnetic recording medium, a substance has been added to the binder, thereby to give wear resistance and smoothness to the contact surface of the magnetic recording medium. However, in the magnetic recording medium having the ferromagnetic metal thin film as recording film, when such improvements are intended in wear resistance, smoothness and running durability of the magnetic recording medium per se by, for instance oxidizing the surface of the recording film, the deterioration of magnetic property of the recording film can not be avoided. Therefore, it is necessary to keep the characteristics of the recording film such as wear resistance, by forming a protective film on the surface of the recording film. And further, since such a protective film brings about the spacing between the magnetic head and the recording film, thickness of the protective film should be as small as possible.

Hitherto, the protective films wherein organic matter as lubricating material is applied/or vapor deposited on the surface of the ferromagnetic metal has been developed. Since the wear resistance of such organic matter is inferior, they could not bear long time of use. Therefore, trials has been made in forming the films of amorphous carbon or graphite on the surface of the ferromagnetic metal film by vacuum vapor deposition, sputtering or the like, and the smoothness has been improved to a certain extent, but satisfactory wear resistance have not been obtained.

In case the the above-mentioned materials are used as the protective film for the magnetic recording medium wherein the ferromagnetic metal thin film is used as the recording film, thickness of the protective film must be made large, since the wear resistance thereof is not satisfactory. As a result, the spacing between the magnetic head and the magnetic recording medium becomes large, thereby generating a large spacing loss. Furthermore, since the above-mentioned protective film is worn due to contact with the magnetic head, fine powder of the protective layer material is produced, and the powder sticks to the magnetic head, thereby remarkably lowering quality and level of output due to clogging up and dropout.

Because of the above-mentioned problems, practical use of the high density magnetic recording medium having the ferromagnetic metal thin film as recording film has been hitherto much restricted. Therefore, satisfactory high density recording can not be attained so long as the above-mentioned problems are not settled.

In order to solve the above-mentioned problem, the following properties are required for the protective film:

(1) Smoothness and wear resistance are excellent.

(2) Adhesive ability with the ferromagnetic metal is excellent.

Moreover, it is required to satisfy the following conditions for forming the protective film:

(1) Even when the thickness of the protective film is small, a homogeneous film can be formed.

(2) Deposition rate is large and mass-productionability is excellent.

(3) Deposition temperature is not as high as the substrate such as polyethylene base film (in case of tape-shaped magnetic recording medium) is damaged.

Diamond is suitable for material for the protective film satisfying the above-mentioned requirement. The diamond is a crystal having the highest hardness in all substances, and it is extremely chemically stable and is considered to be splendid in the wear resistance and durability in various surroundings of usage. Concerning methods for forming the thin film of the diamond, many reports have been made, and they are disclosed in the reference literatures as follows:

(1) Oyokikaikogaku (Applied Mechanical Engineering), July/1984, "Daiamondo Hakumaku No Teiatsugosei No Kenkyu" (Investigation of low pressure synthesis of diamond thin layer)

(2) Gendaikagaku (Modern Chemistry), September/1984, "Daiamondo No Teiatsugosei" (Low pressure synthesis of diamond)

(3) Nihon Sangyogijutsu Sinkokyokai (Japan Industrial Technology Promotion Association) Gijutsu Shiryo (Technical data) No. 138, June/1984, "Daiamondo No Teiatsugosei" (Low pressure synthesis of diamond)

However, all of them are in an academic researching stage, and have not been put into practice. Furthermore, it is very difficult to use them as a forming means of the diamond protective film for the magnetic recording medium which needs the mass-productionability, because the above-mentioned methods need heating of the base material in high temperature (above 400° C.), and the deposition velocity of film is lower (maximum 200-300 Å/minute).

OBJECT AND SUMMARY OF THE INVENTION

The present invention is intended to solve the above-mentioned problems, and the purpose of the present invention is to obtain a magnetic recording medium provided with a protective film splendid in wear resistance and durability in various surroundings on a recording film made of ferromagnetic metal.

The magnetic recording medium of the present invention comprises:
  a substrate of non-magnetic material,
  a recording film made of ferromagnetic material and formed on the substrate, and
  a protective film which is provided on the recording film and comprises an amorphous carbon film made of amorphous carbon having diamond bonds or both of diamond bonds and graphite bonds, and an organic compound film formed on the amorphous carbon film and made of organic compound having at least one fatty alkyl group having at least 8 carbon atoms at the end of molecular structure thereof.

DESCRIPTION OF THE PREFERRED EMBODIMENT

In advance of explaining an embodiment of the present invention, a method for forming high hardness carbon film used as protective film of the present invention having been developed by the inventors is described below.

Hydrocarbon gas as raw material gas of carbon film is made plasma in a pressure of 10-100 Pa, and the plasma are blown to a substrate as accelerating at least ions in the plasma. Thereby, it becomes possible to form the high hardness carbon film having above 200 kg/mm$^2$ of Vickers hardness in high deposition rate as about 5000 Å/minute in normal temperature, without heating the substrate. The above-mentioned method is called plasma-injection chemical vapor deposition method (hereinafter referred to as PI-CVD method).

A carbon film prepared by PI-CVD method was analyzed and characteristics thereof were observed. A crystallization property was observed by an electron diffraction and a transmission electron microscope. A composition was analyzed by a secondary ion mass spectrometry, and a structure was observed by a Raman spectroscopy analysis and an energy loss spectrum analysis. As a result, it was proved that the carbon film is a amorphous i.e. diamond like carbon film (so called i-carbon film) wherein carbon having a graphite bonds (SP$^2$ electron configuration) and slight amount of hydrogen are contained as a mixture in carbon having bonds (SP$^3$ electron configuration).

The diamond like carbon film made by the PI-CVD method shows above 2000 kg/mm$^2$ Vickers hardness and is splendid in wear resistance. Furthermore it shows large thermal conductivity almost equal to metal as about 0.6 cal/cm.sec.C.° and is splendid in radiation of frictional heat.

In such formation of the diamond like carbon film by the PI-CVD method, there are two requirements for the substrate. The first requirement is that specific resistance is less than $10^{13}$ Ω.cm. Such a material having the specific resistance of above $10^{13}$ Ω.cm generally shows a property of an insulation material, and therefore, in the PI-CVD method wherein a film is formed by bombering plasma containing ions to the substrate, surface of the film is charged with electricity and repels the ions, thereby preventing a formation of strong film. Furthermore, when neutralization means such as irradiation of electron beam is taken, it is possible to form the firm layer, but the materials having a specific resistance of above $10^{13}$ Ω.cm are not preferable since a construction of apparatus becomes complicated.

Another requirement is that the material has a large chemical affinity with carbon and a large bonding strength between atoms in carbide formed by the PI-CVD method.

Materials which satisfy the above mentioned two requirements are metals such as Al, Be, Co, Cr, Fe, Mn, Ni, Zn, Hf, V, Nb, Ta, Mo, W, alloys containing the above-mentioned metals as main component and semiconductors made from Si, Ge, B and SiC or the like. Particularly, Si, B, Cr firmly combine with carbon in covalent bond or the like. The specific resistance of the diamond like carbon film is about $10^7$–$13^{13}$ Ω.cm and satisfies the above-mentioned first requirement.

The ferromagnetic metals such as Co, Ni, and Fe and so on satisfy the above-mentioned two requirements, and therefore, it is possible to firmly form the diamond like carbon film on the surface of the recording film, and it is more effective that the surface of the recording film is cleaned by plasma of Ar, $O_2$ or the like before the formation of the diamond like carbon film.

Moreover, for instance, in case of tape-shaped magnetic recording medium, mass productionability is required, and furthermore when polyethylene or the like is used as the substrate, temperature rise to be allowed during formation of the protective film is limited. Therefore, the formation of the diamond like carbon film onto such a recording medium is realized for the first time by the PI-CVD method.

As mentioned above, by means of the PI-CVD method, it becomes possible to obtain the recording medium provided with the protective film made of the diamond like carbon on the surface of the recording film of the ferromagnetic metal, and the resultant recording film is splendid in durability and wear resistance. However, even the recording medium provided with the diamond like carbon film as the protective film causes a clogging up of head and deterioration of output due to dust in the air, exfoliation of the recording medium at the end thereof and transcription of stain from the back face of the recording medium to the surface thereof. Moreover, coefficient of friction of the diamond like carbon film becomes large under the condition of high temperature and high humidity. In order to improve the above-mentioned disadvantage, it is very much effective to form an organic compound film having excellent lubrication ability, for instance organic compound film containing fluorine, on the surface of the protective film made of the diamond like carbon. The organic compound may be formed directly on the diamond like carbon film and formed indirectly thereon by means of transcription. Besides the conventional wet-coating method, dry-process such as sputtering method, vapor deposition method can be used for the method for forming the organic compound film.

As mentioned above, by means of the PI-CVD method, it becomes possible to form the diamond like carbon film onto the surface of the recording film made of ferromagnetic metal such as Co, Ni, and Fe and so on in high deposition rate. Particularly, in case of Co/Cr alloy recording film, strong film is formed, since rather large amount of Cr is maldistributed at the surface thereof.

The diamond like carbon film is of amorphous, and its characteristics resemble diamond. Therefore it is very much suitable for protecting the recording film. Moreover, as a result of being amorphous, the diamond like carbon film is flexible to a certain extent, and therefore it is also suitable for protecting the recording film formed on a flexible substrate such as polyethylene film.

When a thickness of the diamond like carbon film is above 500Å, bending stiffness becomes large, and as a result, contact between the diamond like carbon film and the magnetic head is unstable and furthermore, in case of the flexible recording medium, undesirable crack is caused by figure variation thereof. Moreover, when the thickness is less than about 20-30Å the diamond like carbon film becomes not uniform to form an island structure, thereby extremely lowering still durability and corrosion resistance. And therefore, when the diamond like carbon layer made by the PI-CVD method is used for the protective film for the magnetic recording medium, it is preferable that the thickness thereof is 30-500Å. Moreover, in case of the tape shaped magnetic recording medium, when contact stability with the magnetic head and reliability are taken into account, it is desirable that thickness is 50-300Å. Additionally, in case of the recording medium which intend to adaptation for the high density recording, for instance vertical recording medium of ME tape for 8 mm video tape recorder, in order to decrease the spacing loss (e.g. the spacing loss is about 6 dB at 0.5 $\mu$m recording frequency, 300Å thickness), and to draw out feature of the diamond like carbon film, about 50-150Å thickness is desirable.

The organic compound film having a superior slidability is formed on the diamond like carbon film. The organic compound film has large contact angle, and dusts in surrounding air and transcribed stains or the like hardly stick thereon. Therefore, the clogging up and dropping out due to the dusts and stains are remarkably decrease by forming the organic compound film on the diamond like carbon film. Moreover, it is also possible to decrease the coefficient of friction under a particular condition (e.g. at 40° C. temperature and 90% relative humidity) by selecting a desirable composition of the organic compound, thereby improving a running stability and decreasing a wear amount of the magnetic head.

EXAMPLE

Figure 1:
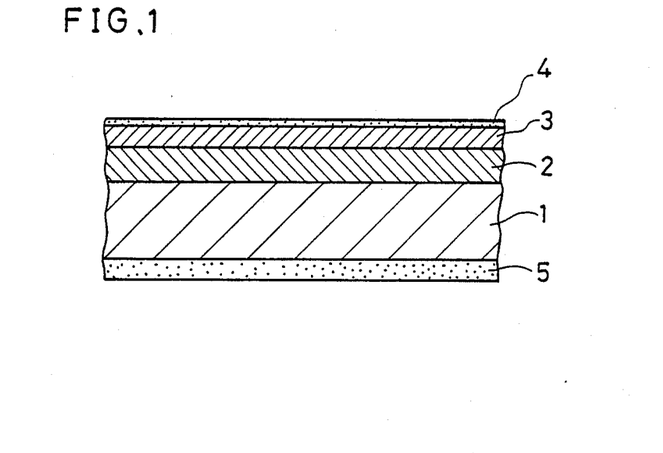
FIG. 1 is a sectional view of a magnetic recording medium for showing a fundamental concept of the first embodiment of the present invention.

An embodiment of the present invention is shown in FIG. 1. A substrate 1 is made of a non-magnetic material such as plastic, glass and metal, and has tape-shaped figure, card-shaped figure, disk-shaped figure or the like. A recording film 2 made of a ferromagnetic metal such as Co, Cr, Ni and Fe is formed on the substrate 1 by a vapor deposition method, sputtering method or the like and thickness thereof is about 1000-3000Å. For instance, in case of Co-Cr alloy vertical magnetic recording medium wherein 10-30% of Cr is added to Co as main component, columnar crystal structure which is rich in Co is formed, and Cr segregates at a border part between each columnar crystals. Therefore, a top surface of the recording film 2 is abound in Cr.

A diamond like carbon film 3 made by the PI-CVD method is formed on the recording film 2. As mentioned above, the surface of the vertical recording medium using Co-Cr alloy film as the recording film is abound in Cr, and therefore the diamond like carbon film which strongly sticks to surface thereof is formed. Thickness of the diamond like carbon film is less than 1000Å, preferably less than 300Å, and it can be determined depending on a reliability to be required or a type of magnetic recording apparatus using the diamond like carbon film.

An organic compound film 4 is formed on the recording film 2. The organic compound has the following advantages; dusts in surroundings air, transcribed stains hardly stick thereon, and further the organic compound decreases a coefficient of friction under the particular condition. There are the following four groups of the organic compound films showing the above-mentioned effects.

A group

An organic compound film made of an organic compound comprising at least one fatty alkyl group having at least 8 carbon atoms and at least one carboxyl of carboxyl group and mercapto group at the end of molecular structure.

<Example>

-continued

1  $C_{17}H_{35}COOH$,
2  $CH_3(CH_2)_7CH=CH(CH_2)_7COOH$,
3  $CH_2OCOC_8H_{17}$
   $|$
   $CHOCOC_8H_{17}$
   $|$
   $CH_2COOH$
4  $C_{18}H_{37}SH$
5  $CH_2OCOC_8H_{17}$
   $|$
   $CHOCOC_8H_{17}$
   $|$
   $CH_2SH$

B group
An organic compound film made of an organic compound comprising at least one fluoroalkyl group having at least 3 carbon atoms and at least one fatty alkyl group having at least 8 carbon atoms at the end of molecular structure.

<Example>
1  $CH_2OCOC_5F_{11}$
   $|$
   $CHOCOC_{12}H_{25}$
   $|$
   $CH_2OCOC_{12}H_{25}$

2

3  $C_{18}H_{37}COOC_8F_{17}$
4  $C_{18}H_{37}CH_2-S-CH_2CH_2C_8F_{17}$
5  $C_{18}H_{37}CH_2$
   $|$
   $O-C_8F_{17}$
6  $C_{18}H_{37}CH_2$
   $|$
   $O-CH_2-CH_2-NOSOC_8F_{17}$
                    $|$
                    $CH_3$
7  $C_{12}H_{25}\underset{\underset{CH_3}{|}}{N}COCH_2CH_2C_8F_{18}$

8  $C_8F_{17}SO_2\underset{\underset{CH_3}{|}}{N}C_{18}H_{37}$

9  $CH_3(CH_2)_7CH=CH(CH_2)_7COO(CF_2)_9H$

10  $C_8H_{17}-O-\underset{\underset{OC_8F_{17}}{|}}{\overset{\overset{R}{|}}{P}}-OC_8F_{17}$ C group
An organic compound film made of an organic compound comprising at least one fluoroalkyl group having at least 3 carbon atoms and at least one fatty alkyl group having at least 8 carbon atoms and at least one carboxyl group at the end of molecular structure.

<Example>
1  $CH_2OCOC_5F_{11}$
   $|$
   $CHOCOC_{12}H_{25}$
   $|$
   $CH_2COOH$

2

3  $C_{18}H_{37}-\underset{\underset{O-C_8F_{17}}{|}}{\overset{\overset{H}{|}}{C}}-COOH$ 4  $C_{18}H_{37}-\underset{\underset{S-CH_2CH_2C_8F_{17}}{|}}{\overset{\overset{H}{|}}{C}}-COOH$ 5  $C_8H_{17}-\underset{\underset{O-C_8F_{17}}{|}}{\overset{\overset{H}{|}}{C}}(CH_2)_8COOH$ 6  $C_{18}H_{37}-\underset{\underset{O-CH_2CH_2NOSOC_8F_{17}}{\underset{|}{\,}}}{\overset{\overset{H}{|}}{C}}-COOH$
                                $|$
                                $CH_3$ 7  $C_8H_{17}-\underset{\underset{S-CH_2CH_2C_8F_{17}}{|}}{\overset{\overset{H}{|}}{C}}(CH_2)_8COOH$

8  $C_{12}H_{25}NCOCH_2CH_2C_8F_{17}$
   $|$
   $CH_2COOH$

9  $C_8F_{17}SO_2NC_{18}H_{37}$
   $|$
   $CH_2COOH$

10  $CH_3(CH_2)_7CH=CH-CH_2CH_2-COO(CF_2)_8H$
                              $|$
                              $COOH$

D group
An organic compound film made of an organic compound comprising at least one fluoroalkyl group having at least 3 carbon atoms and at least one fatty alkyl group having at least 8 carbon atoms and at least one of carboxyl group at the end of molecular structure.

<Example>
1  $CH_2OCOC_8H_{17}$
   $|$
   $CHOCOCH_2SH$
   $|$
   $CH_2OCOC_{12}H_{25}$

2

3  $C_{12}H_{23}CHCOOCH_2CH_2C_8F_{17}$
   $|$
   $SH$

-continued

4

5  $COOC_8H_{17}$ — (benzene ring with) $COOCH_2CH_2CF_2CF_2CF_2CF_2CF_2H$, $SH$ 6  $COOC_{12}H_{25}$ — (benzene ring with) $COOCH_2CH_2NOSOC_8H_{17}$ (with H on N), $SH$ The above-mentioned organic compound film is formed by applying the organic compound dissolved in a solvent, such as toluene, n-hexane and isopropylalcohol, on the recording film followed by drying it, or by vacuum deposition (organic compound vacuum deposition).

Characteristics for practical use, such as still durability, corrosion resistance, coefficient of friction under particular condition and wear amount of a head, were measured for an ME tape provided with the organic compound film. A result is shown in Table 1 together with comparison data.

TABLE 1

| Protective film | Still durability (minute) | Corrosion resistance (day) | Coefficient of friction | Wear amount of head (μm) |
|---|---|---|---|---|
| Not provided | 3 | 1 | 0.45 | 60 |
| Organic compound film (A, B, C, D,) | 5–10 | 3–7 | 0.21–0.35 | 5–7 |
| Amorphous diamond film | 50 | 4 | 0.38 | 50 |
| Diamond like carbon film and organic compound film A | 100–200 | 14–21 | 0.22–0.25 | 5–7 |
| Diamond like carbon film and organic compound film B | 300–600 | 35–49 | 0.23–0.28 | 2–3 |
| Diamond like carbon film and organic compound film C | 1000–2000 | 56–70 | 0.18–0.21 | 1–2 |
| Diamond like carbon film and organic compound film D | 800–1500 | 35–49 | 0.17–0.19 | 0.5–1 |

Testing condition:
(1) Organic compound applying amount: 10 mg/m²
(2) Still durability: showing a period till an output decreases by 3 dB.
(3) Corrosion resistance: showing a period till a spot corrosion generates.
(4) Coefficient of friction: measured under conditions of 40° C.; 80% RH; 180° winding angle to SUS 420 J2; running speed 1 cm/sec.
(5) Wear amount of head: showing a wear amount of ferrite head measured under conditions of 23° C.; 70% RH; tape running speed after 300 Hr of tape running time.

Testing condition:
(1) Organic compound applying amount: 10 mg/m²
(2) Still durability: showing a period till an output decreases by 3 dB.
(3) Corrosion resistance: showing a period till a spot corrosion generates.
(4) Coefficient of friction: measured under conditions of 40° C.; 80% RH; 180° winding angle to SUS 420 J2; running speed 1 cm/sec.
(5) Wear amount of head: showing a wear amount of ferrite head measured under conditions of 23° C.; 70% RH; tape running speed after 300 Hr of tape running time.

As shown in Table 1, in case of a protective film having only organic compound film, although the coefficient of friction is small, the still durability and corrosion resistance can not be improved.

In case of a protective film having only diamond like carbon film, the still durability is improved, thereby protecting effitively the recording film 2. But, the coefficient of friction under the particular condition is large, and a problem of wear of a magnetic head is not improved. Moreover, effect of moisture-proof is not splendid, since the diamond like carbon film has a amorphous structure, and corrosion resistance is not splendid more than that of the organic compound film.

On the other hand, in case that the organic compound film 4 is formed on the diamond like carbon film 3, the still durability and the corrosion resistance are remarkably improved in comparison with the case each film is used independently. Furthermore, as the coefficient of friction under the particular condition lowers the wear amount of the head decreases, thereby enabling obtaining a magnetic recording medium splendid in total performance.

In the organic compound film, C group and D group are superior. The organic compound comprising the fluoroalkyl group having at least 3 carbon atoms is very much splendid in the still durability, corrosion resistance, and decreasing the wear amount of the head. It is considered that those characteristics come from that an adhesion ability and contact angle enlarging ability are improved, and a synergetic effect of combination of the organic compound film and the diamond like carbon film is remarkably increased. Moreover, the organic compound having the carboxyl group or mercapto group is more splendid in slidability under the particular condition and still durability.

In case of the organic compound not containing the fatty alkyl group having at least 8 carbon atoms, the above-mentioned synergetic effect can not be obtained, and forming of the organic compound film made of this organic compound is liable to become uniform. The reason of this is considered that an affinity to the diamond like carbon film is not satisfactory. The fatty alkyl group and the fluoroalkyl group may be not only straight-chain type but also isomer thereof having blanch.

In general, the organic compound film 4 is directly formed on the diamond like carbon film 3. However, in case of a tape-shaped recording medium, the organic compound film 4 may be indirectly formed on the surface of the diamond like carbon film 3 by applying that the organic compound for the organic compound film 4 is applied on a back coating film 5 provided on an opposite side of the substrate 1, or by applying the above-mentioned organic compound directly on the opposite side of the substrate 1, or by transferring the same onto the surface of the diamond like carbon film 3, when those recording media are wound on a reel or the like thereby forming the organic compound film 4.

Preferably, a coating amount of the organic compound is 0.1–500 mg/m$^2$, and the most preferred coating amount is 0.2–200 mg/m$^2$.

Figure 2:
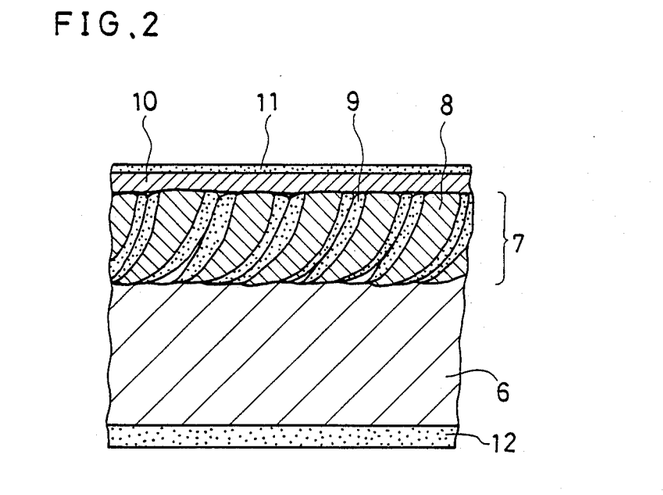
FIG. 2 is a sectional view showing a magnetic recording medium of the second embodiment of the present invention.

Another embodiment of the present invention is shown in FIG. 2. A recording film 7 of ferromagnetic alloy, for instance Co-Ni alloy, formed by sputtering method or vacuum deposition method has a columnar crystal structure. Since the columnar crystal particles 8 restructuring the columnar crystal structure combine ferromagnetically with each other, a magnetic domain is large and therefore, a magnetic noise is larger than the conventional coating type recording medium. In order to decrease the magnetic noise, it is effective that the columnar crystals are made fine and magnetically isolated. Therefore, in the present embodiment, the ferromagnetical bonding is prevented by providing a metal oxide layer 9 on the surface of the columnar crystals 8, thereby making the magnetic domain fine.

Figure 3:
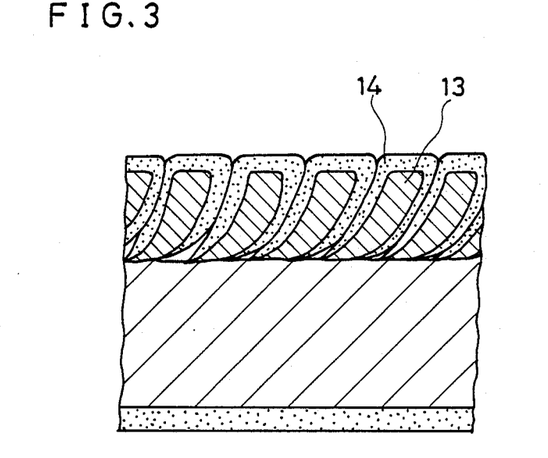
FIG. 3 is a sectional view showing a magnetic recording medium in the middle of preparation process thereof.

The metal oxide layer 9 is generally formed on the columnar crystals 8 by making the sputtering or the vapor deposition in a oxygen atmosphere. In this manner as shown in FIG. 3, the metal oxide layer 14 is formed on all circumference of the columnar crystals. As a result, the metal oxide layer 14 provided on the surface of the recording film 7 brings about a spacing between the magnetic head and the columnar crystals, thereby causing a spacing loss. The metal oxide layer 14 is removed by an Ar gas sputtering or the like, and thereafter, the diamond like carbon film 10 and the organic compound film 11 are formed. The metal oxide layer 14 provide on the recording film 14 is harder than the columnar crystal 13, and in many cases, it also shows an effect of increasing of mechanical strength. Therefore, when the metal oxide layer 14 is removed, a durability against a contact with the magnetic head deteriorates, and as a result, a satisfactory performance characteristics can not be obtained by the conventional organic compound protective film.

Figure 4:
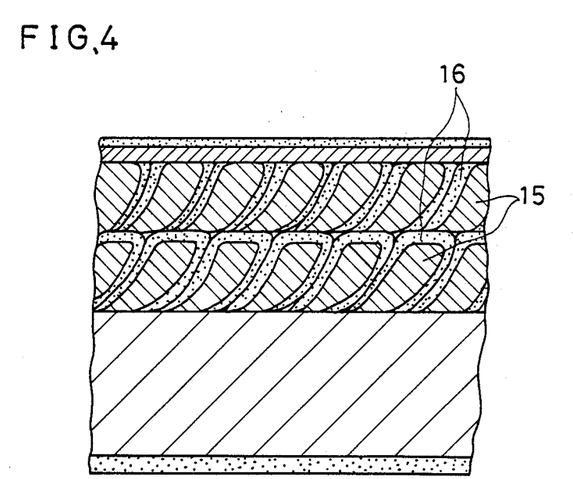
FIG. 4 is a sectional view showing a magnetic recording medium of the third embodiment of the present invention.

On the other hand, in this embodiment, a practical durability can be obtained by using both of the diamond like carbon film 10 and the organic compound film 11 as the protective film. Moreover, in order to more effectively decrease the magnetic noise by making the columnar crystal 8 fine, as shown in FIG. 4, the columnar crystal structure may be made multilayered structure.

The diamond like carbon film may be formed without removing the metal oxide layer on the surface of the recording film. However, in case that, for example, the diamond like carbon film is formed by PI-CVD method, the following problem is caused. As mentioned above, in the PI-CVD method, a plasma of a hydrocarbon gas, such as methane gas is used, and therefore, the hydrocarbon gas decomposes to produce an atomic state hydrogen. The atomic state hydrogen contributes to a formation of the diamond like carbon film due to (1) a dehydrogen effect and (2) a graphite removing effect. However, since it is extremely active, it shows such effects that the surface of the metal oxide layer is chemically sputtered or reduced. Hence, when the diamond like carbon film is formed on the surface of the metal oxide layer provided on the metal magnetic recording medium, the metal oxide is partly or entirely reduced by impact of active atomic state hydrogens and ions. Atomic density of the metal oxide layer becomes small due to the reduction, and mechanical strength thereof remarkably deteriorates. Therefore, an effect for improving the durability obtained by forming the diamond like carbon film on the metal oxide film is considerably decreases. When, a thickness of the diamond like carbon film is more than about 200Å, the deterioration of durability of the metal oxide film can be compensated by a stiffness of the diamond like carbon film per se. However, as the thickness becomes small, it becomes difficult to compensate the durability deterioration of the metal oxide only by stiffness of the diamond like carbon film, and as a result, the durability of the magnetic recording medium lowers. In order to synthesize the diamond like carbon film, an impact energy of the atomic state hydrogen and ion is generally used, and therefore the above-mentioned problems are induced even when any other methods than the PI-CVD method are used.

Figure 5:
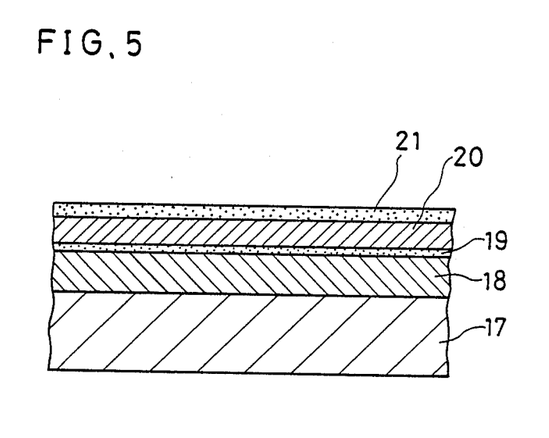
FIG. 5 is a sectional view showing a magnetic recording medium of the third embodiment of the present invention.

In order to solve the problem, it is required to form the diamond like carbon film with protecting the surface of the metal oxide layer from the reduction function of the atomic state hydrogen and the impact of ions. Hence, as shown in FIG. 5, it is intended to form a shield film 19 on the surface of the recording film 18. With respect to method of formation of the shield film 19, any methods such as sputtering method, CVD method and coating method may be used so far as they form a uniform film without causing a pin hall, and do not change a characteristic of the recording film 18 as prepared. A material which does not influenced by the impact of the atomic state hydrogen and ions during the sputtering for synthesizing the diamond like carbon film 20 is preferable for the shield film 19. Moreover, a material constituted by elements, such as carbon, hydrogen and fluorine, which does not substantially deteriorate the characteristic of the diamond like carbon film even when they are enclosed therein during the sputtering process can be used.

A typical example is described hereinunder.

Figure 6A:
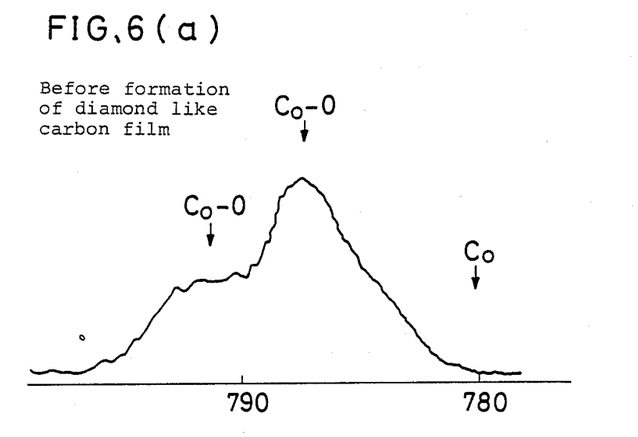
FIG. 6 and FIG. 7 are characteristic diagrams showing results of electron spectroscopy for chemical analysis (hereinafter referred to as ESCA) for surface of a magnetic recording medium before and after formation of diamond like carbon film.
Figure 6B:
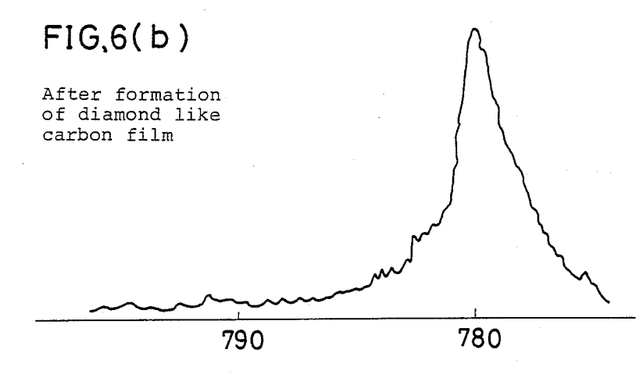
Figure 7A:
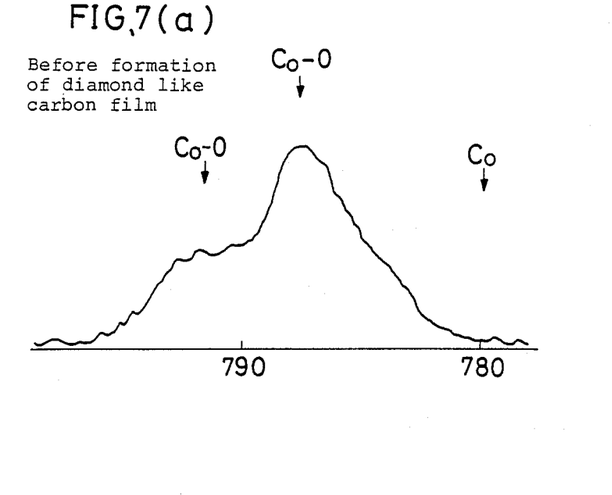
Figure 7B:
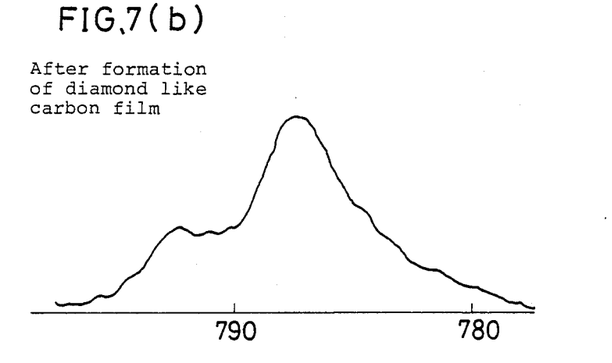

Co-Ni-O magnetic recording film 18 is provided with the shield film 19 made of fluorine contained organic compound obtained by PI-CVD method using octafluorocyclobutane ($CC_4F_8$) gas as a raw material gas thereon. An organic compound for the organic compound film is represented by the $C_xF_y$ ($y/x=1.2$ to $1.8$), and a thickness of the organic compound film is at most 100Å. The diamond like carbon film 20 is formed on the fluorine-containing organic compound film by the PI-CVD method. In case that the fluorine-containg organic compound film was not provided on the recording film 18, the Co-O metal oxide layer was decreased by the reduction function and the impact energy of the ions as shown in FIG. 6 which indicates a result of ESCA. On the other hand, when the shield film 19 made of the fluorine contained organic compound was formed on the recording film 18, it was observed that nearly 90% of Co-O is retained after the formation of the diamond like carbon film 20 as shown in FIG. 7. A practical durability of the recording medium of the present invention is observed by a still durability test. The still test is a test for measuring the practical durability of a VTR in still mode, and is considered to be the most severe test as the durability test since the magnetic head rubs the same place on the tape. Result is shown in Table 2.

TABLE 2

Result of Still Durability Test
(Tension: 20 g, Head: amorphous head)

| Fluorine contained organic compound film Å | Diamond like carbon film Å | Ratio of Co—O/Co after formation of diamond like carbon film | Still durability (hour) |
|---|---|---|---|
| 0 | 200 | 0.05 or below | 20 or above |
| 0 | 150 | 0.05 or below | 3 |
| 0 | 100 | 0.05 or below | 1-2 |
| 15 | 100 | 0.37 | 18-20 |
| 45 | 100 | 0.40 | 18-20 |
| 15 | 60 | 0.38 | 6-8 |

As shown in Table 2, when the thickness of the diamond like carbon film is 200Å or above, satisfactory still durability is obtained even if the shield film is not provided. However, when the thickness of the diamond like carbon film is small, it is impossible to compensate the deterioration of the durability of the recording film due to the reduction of the metal oxide layer. On the other hand, by forming the shield film 19 made of the fluorine contained organic compound on the recording film 18, the still durability is improved, and even when the thickness of the diamond like carbon film 20 is about 60Å, higher still durability is obtained in comparison with the case of forming the diamond like carbon film having 150Å thickness without providing the shield film 19.

Fluorine contained in the organic compound film shows satisfactory shield effect even when the thickness thereof is less than 50Å. Therefore, the deterioration of the magnetic property due to the spacing loss or the like is considerably small. Moreover, when the organic compound film 20 is provided on the surface of the diamond like carbon film 21, characteristics such as the durability are improved more by the synergetic effect of the diamond like carbon film 21 and the organic compound film 20 as mentioned in the first embodiment.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafer claimed.

As mentioned above, the magnetic recording medium excellent in total performance characteristic can be obtained by forming the protective film constituted of the diamond like carbon film and the organic compound film on the ferromagnetic metal recording film.

The present invention is remarkably effective for realizing the high density recording using the magnetic recording medium wherein the ferromagnetic metal is used for the recording film.

What is claimed is:

1. A magnetic recording medium, comprising:
   a substrate of non-magnetic material;
   a recording film having a chemical affinity for carbon and a specific resistance less than $10^{13}\Omega.cm$ and formed on said substrate; and
   a protective film provided on the recording film and including
   (a) an amorphous carbon film of amorphous carbon having diamond bonds or amorphous carbon having both graphite and diamond bonds, and
   (b) an organic film formed on said amorphous carbon film and made of an organic compound having at least one fatty alkyl group having at least 8 carbon atoms at the end of a molecular structure thereof.

2. A magnetic recording medium in accordance with claim 1, wherein
   said protective film contains hydrogen.

3. A magnetic recording medium in accordance with claim 1, wherein
   said organic compound film is made of organic compound having at least one fatty alkyl group comprising besides said at least 8 carbon atoms, at least one fluoroalkyl group having at least 3 carbon atoms and at least one carboxyl group at the end of said molecular structure.

4. A magnetic recording medium in accordance with claim 1, wherein
   said organic compound film is made of organic compound having at least one fatty alkyl group comprising besides said at least 8 carbon atoms, and at least one fluoroalkyl group having at least 3 carbon atoms at least one mercapto group at the end of said molecular structure.

5. A magnetic recording medium in accordance with claim 1, wherein
   said organic compound film is made of organic besides said at least 8 carbon atoms and at least one fluoroalkyl group having at least 3 carbon atoms at the end of said molecular structure.

6. A magnetic recording medium in accordance with claim 1, wherein
   said organic compound film is made of organic compound having at least one fatty alkly group comprising besides said at least 8 carbon atoms and at least one selected from the group consisting of carboxyl group and mercapto group at the end of said molecular structure.

7. A magnetic recording medium in accordance with claim 1, wherein
said amorphous carbon film has 30-500Å thickness.

8. A magnetic recording medium in accordance with claim 1, wherein
said organic compuond film is formed by applying said organic compound in an amount of 0.1-500 mg/m².

9. A magnetic recording medium in accordance with claim 1, wherein
said recording film is made of ferromagnetic metal having a columnar crystal structure, and a metal oxide layer is provided on a surface of said columnar crystal particles.

10. A magnetic recording medium in accordance with claim 9, wherein
said columnar crystal structure comprises a multilayered structure of said columnar crystal particles.

11. A magnetic recording medium in accordance with claim 1, wherein
said recording film is made of a ferromagnetic metal having columnar crystal particles surrounded by an oxide layer coating and a shield film is provided between said recording film and said amorphous carbon film.

12. A magnetic recording medium in accordance with claim 11, wherein said shield film is made of at least one member selected from the group consisting of carbon, oxygen, hydrogen, fluorine and combinations thereof.

13. A magnetic recording medium in accordance with claim 11, wherein
a thickness of said shield film is 50Å or below.

14. A magnetic recording film according to claim 11, wherein said shield film comprises a fluorine-containing organic compound.

15. A magnetic recording film according to claim 14, wherein said shield film comprises a compound represented by the formula $C_xF_y$, wherein $y/x = 1.2$ to $1.8$.

* * * * *